United States Patent
Yoon

(10) Patent No.: US 6,425,750 B1
(45) Date of Patent: Jul. 30, 2002

(54) ALUMINUM CHASSIS HAVING HEAT INSULATING FOAM FILLED IN HOLLOW, ITS MANUFACTURING METHOD AND APPARATUS

(75) Inventor: Kyu-Tae Yoon, Chung-Gu (KR)

(73) Assignee: Mipo Chemicals Co., Ltd., Kyonggi-do (KR)

( * ) Notice: Subject to any disclaimer, the term of this patent is extended or adjusted under 35 U.S.C. 154(b) by 0 days.

(21) Appl. No.: 09/582,729

(22) PCT Filed: Jan. 8, 1998

(86) PCT No.: PCT/KR99/00026

§ 371 (c)(1),
(2), (4) Date: Jun. 30, 2000

(87) PCT Pub. No.: WO99/35353

PCT Pub. Date: Jul. 15, 1999

(30) Foreign Application Priority Data

| Jan. 10, 1998 | (KR) | 98-464 |
| Jan. 20, 1998 | (KR) | 98-1578 |
| May 6, 1998 | (KR) | 98-16168 |
| May 6, 1998 | (KR) | 98-16169 |
| May 6, 1998 | (KR) | 98-16170 |

(51) Int. Cl.$^7$ ................................ B29C 44/24
(52) U.S. Cl. ................ 425/110; 425/404; 425/449; 425/817 R
(58) Field of Search ................. 425/110, 117, 425/DIG. 60, DIG. 111, 449, 404, 4 R, 817 R; 264/46.6, 46.7, 46.9, 45.4, 101

(56) References Cited

U.S. PATENT DOCUMENTS

| 3,553,772 A | * | 1/1971 | Premo | 425/217 |
| 5,324,460 A | * | 6/1994 | Briggs | 264/45.2 |
| 5,545,022 A | * | 8/1996 | Rosasco | 425/110 |
| 5,653,923 A | * | 8/1997 | Spoo et al. | 264/46.1 |

* cited by examiner

Primary Examiner—Nam Nguyen
Assistant Examiner—Joseph S Del Sole
(74) Attorney, Agent, or Firm—Robert E. Bushnell, Esq.

(57) ABSTRACT

The present invention provides an apparatus for forming an aluminium chassis having heat insulating foam filled in a hollow portion, and more particularly to an improvement wherein the heat insulating foam is filled in the hollow portion of the aluminium chassis for windows and doors principally in order to improve an efficiency of heat insulation and sound absorption.

23 Claims, 10 Drawing Sheets

ALUMINUM CHASSIS HAVING HEAT INSULATING FOAM FILLED IN HOLLOW, ITS MANUFACTURING METHOD AND APPARATUS

TECHNICAL FIELD

The present invention relates to an aluminium chassis having heat insulating foam filled in a hollow portion, its manufacturing method and apparatus, and a method for controlling the apparatus, and more particularly to an improvement wherein the heat insulating foam is filled in the hollow portion of the aluminium chassis for windows and doors principally in order to improve an efficiency of heat insulation and sound absorption.

Especially, the present invention relates to a method and apparatus for carrying out efficiently the filling process of the heat insulating foam by filling into the aluminium chassis preliminary granular foam obtained from a first foaming of foamable plastic granules, such as EPS (expandable polystyrene beads) or EPE (expandable polyethylene beads), maturing, cooling and drying the aluminium chassis at a time.

BACKGROUND ART

Generally, an aluminium chassis includes outer tubular surfaces, and may be different in structure according to its use.

Such an conventional aluminium chassis has a drawback in that the heat insulating capability of the hollow portion is not significant when it is mounted to a window or a door, that dew forms on the inner surface if the difference between the room temperature and the outdoor temperature is considerable as in the winter, and that heat loss is numerous and sound absorption is insufficient.

DISCLOSURE OF THE INVENTION

It is therefore the primary objective of the present invention to provide an improvement wherein preliminary granular foam is filled and heated in the hollow portion of the aluminium chassis, and then the heat insulating foam is filled by the maturing process in the maturing room, so as to solve the drawback in use of the conventional aluminium chassis.

It is another objective of the present invention to provide an improvement for carrying out efficiently the filling process of the heat insulating foam by filling into the aluminium chassis heaped side by side preliminary granular foam obtained from a first foaming of foamable plastic granules, such as EPS (expandable polystyrene beads) or EPE (expandable polyethylene beads).

The foregoing objective of the present invention will be better understood by studying the following detailed description of the preferred embodiments of the present invention, in conjunction with the drawings provided herewith.

BEST MODE FOR CARRYING OUT THE INVENTION

Figure 1:
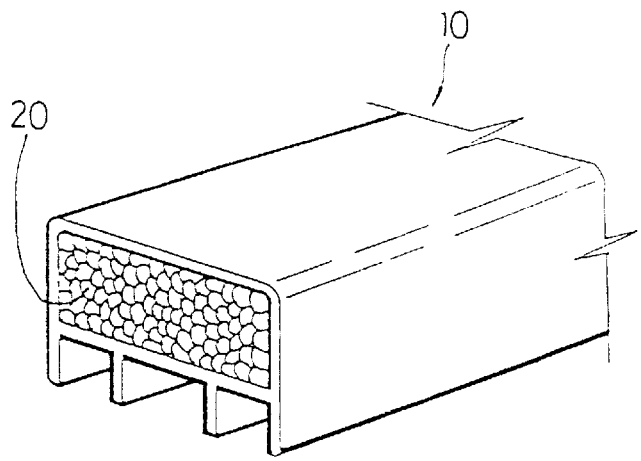
FIG. 1 shows a perspective view of an aluminium chassis according to the present invention.
Figure 2:
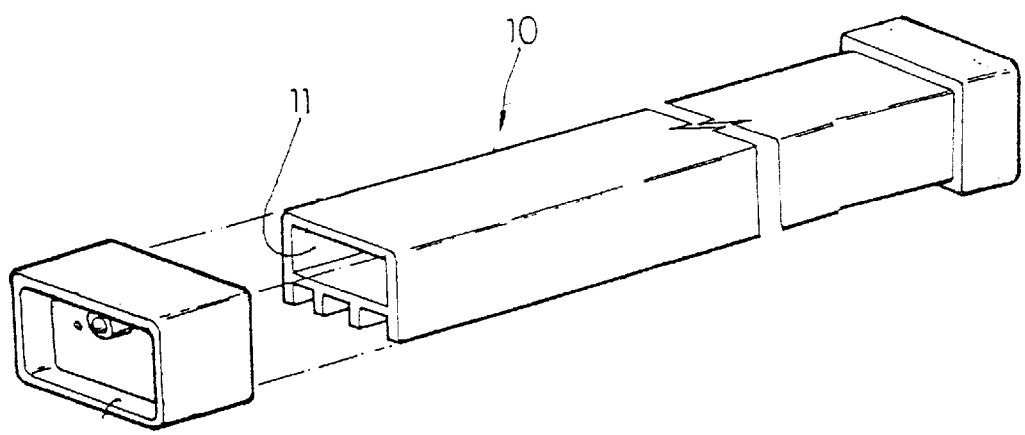
FIG. 2 shows a Perspective view of a preferred embodiment of a plug means according to the present invention.

The manufacturing method according to the present invention and the aluminium chassis made by the above method will now be described with reference to the accompanying drawings.

The present invention provides an aluminium chassis having heat insulating foam filled in the hollow portion, wherein preliminary granular foams foamed by the dry vapor of the temperature ranged between 110–140° C., said preliminary granular foam being obtained from a first foaming of foamable plastic granules, such as EPS (expandable polystyrene beads) or EPE (expandable polyethylene beads), and then heat insulating foam matured at the temperature ranged between 70–100° C. is filled in the hollow portion of the aluminium chassis.

The present invention also provides a method for manufacturing an aluminium chassis having heat insulating foam filled in the hollow portion comprising: filling preliminary granular foam obtained from a first foaming of foamable plastic granules by forming negative pressure in the hollow portion of the aluminium chassis; and maturing by heating the aluminium chassis filled with the preliminary granular foam at the temperature ranged between 110–140° C. for 1 to 7 minutes to fill the heat insulating foam in the hollow portion.

The filling process is accomplished by supplying the dry vapor of the temperature ranged between 110–140° C. simultaneously at the time of filling said preliminary granular foam such that the preliminary granular foam filled in the hollow portion is foamed smoothly.

Meanwhile, another embodiment for the step of filling the granular foam comprises the step of connecting ends of two aluminium chassis heaped side by side such that said two aluminium chassis is filled simultaneously.

The manufacturing apparatus according to the present invention will now be described with reference to the accompanying drawings.

The present invention provides an apparatus for manufacturing an aluminium chassis having a heat insulating foam filled in the hollow of the aluminium chassis 10. The apparatus includes plugging means for plugging the aluminium chassis, filling means for filling the hollow with a preliminary granular foam, and maturing means for maturing the preliminary granular foam to the heat insulating foam.

The plugging means includes a filling plate 110 and an exhaust plate 120. The filling plate 110 and the exhaust plate 120 are connected to both ends of the hollow 11 of the aluminium chassis.

The filling means includes a filling unit 210 and an exhaust unit 250. The filling unit 210 is connected to the filling plate 110 of the plugging means which is connected to said aluminium chassis 10 for supplying preliminary granular foams. The exhaust unit 250 is connected to the exhaust plate 120 for sucking the preliminary granular foam supplied by the filling unit 210 to fill the hollow 11 with the preliminary granular foam.

The maturing means 400 has a maturing room 410 forming a space for receiving the aluminium chassis 10 filled with the preliminary granular foam by the filling means. As shown in FIG. 3, FIG. 10, FIG. 13 and FIG. 14, the filling plate 110 and the exhaust plate 120 of the plug means 100 includes a plurality of filling caps 113 and exhaust caps 123 formed on the inner surface for connecting to more than one aluminium chassis 10 respectively, and a plurality of engaging grooves 111, 121 formed on the outer surface into which the filling unit 210 and the exhaust unit 250 is engaged, and wherein said engaging grooves 111, 121 include paths 112, 122 for engaging more than one filling caps 113 and exhaust caps 123. The filling caps 113 is provided with check valves 114, and the exhaust caps 123 is provided with perforate exhaust holes 124.

Figure 15:
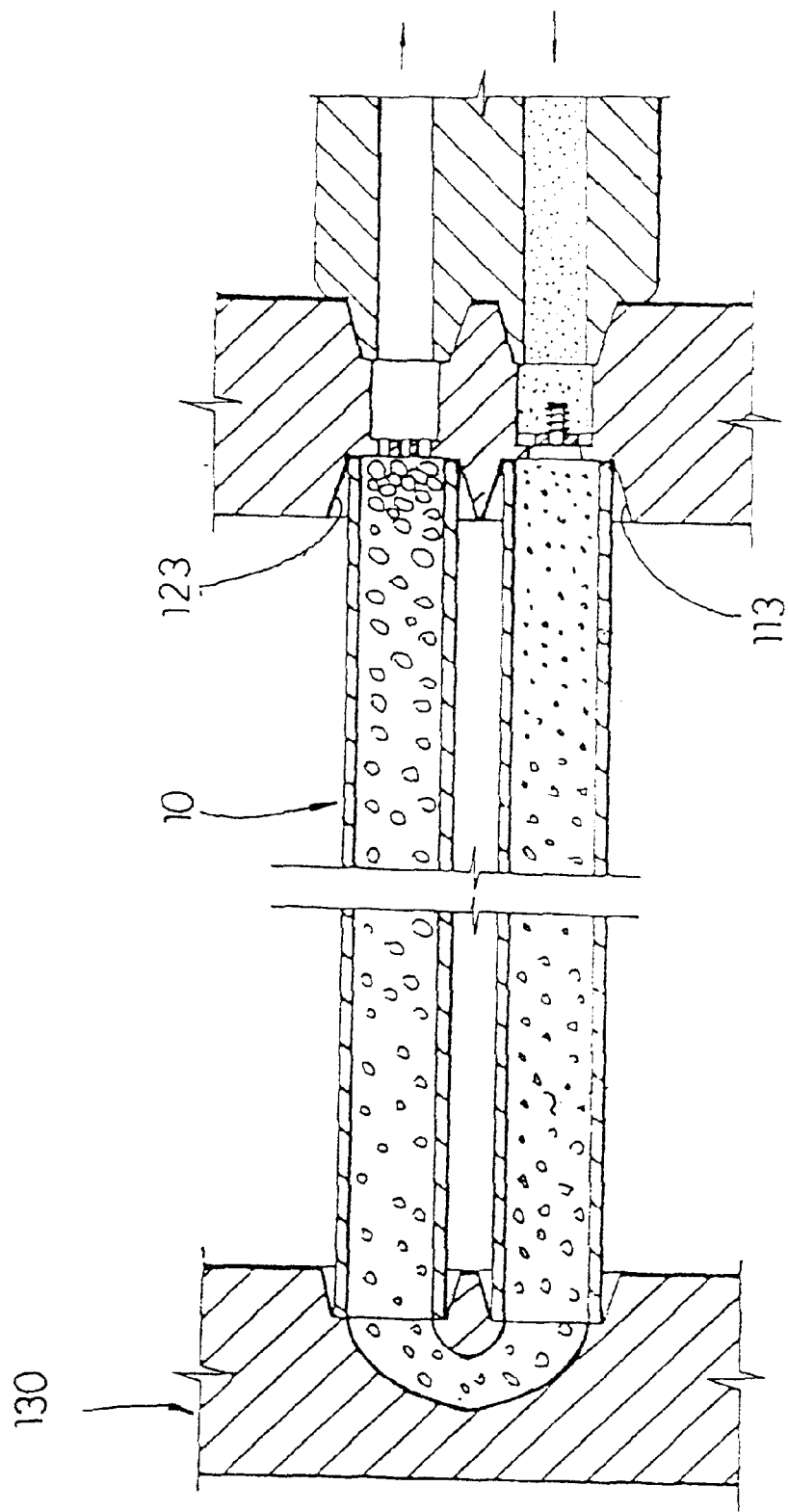
FIG. 15 shows a plan sectional view of another preferred embodiment of the plug means and the filling unit according to the present invention.

Meanwhile, as shown in FIG. 15, it is preferable that the apparatus further comprises a connecting pipe 130 connected to the rear end of said aluminium chassis 10 such that the hollow portions 11 of the aluminium chassis 10 heaped side by side are communicated each other. The filling plate 110 and the exhaust plate 120 are formed integrally such that the filling and exhaust process is carried out at one side. The filling unit 210 and the exhaust unit 250 is also formed integrally.

Figure 3:
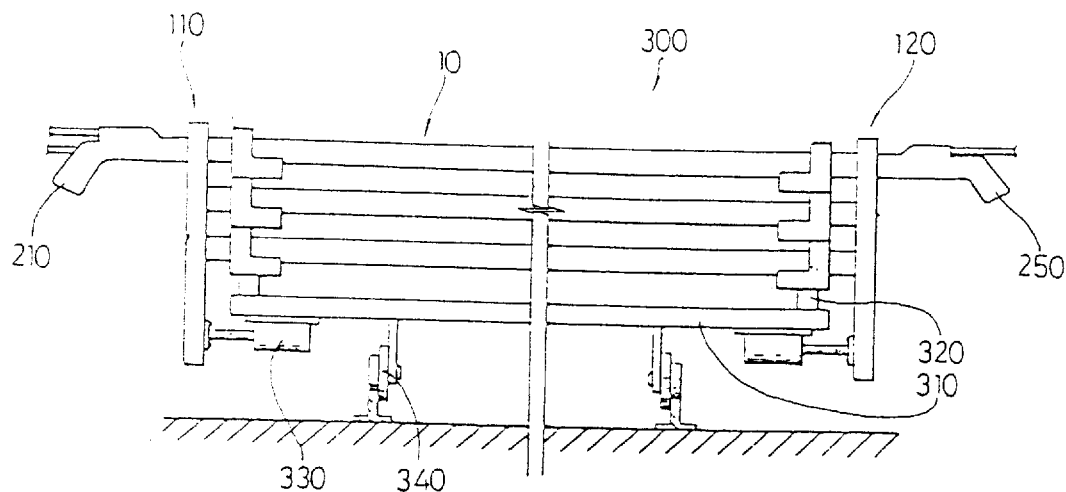
FIG. 3 shows a front elevational view of a preferred embodiment of a filling means and a heaping means according to the present invention.
Figure 10:
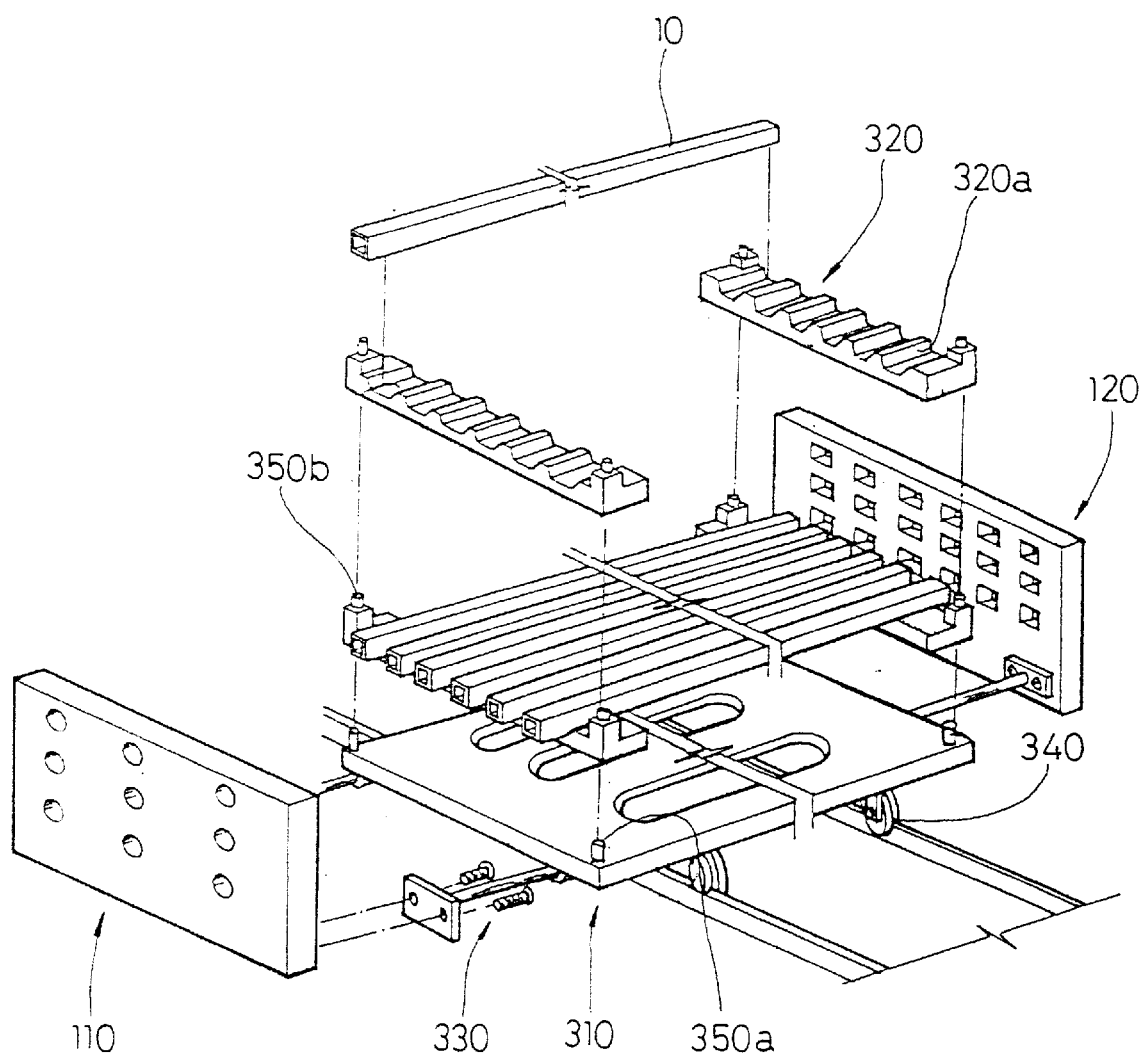
FIG. 10 shows an exploded perspective view of a preferred embodiment of a heaping means according to the present invention.
Figure 11:
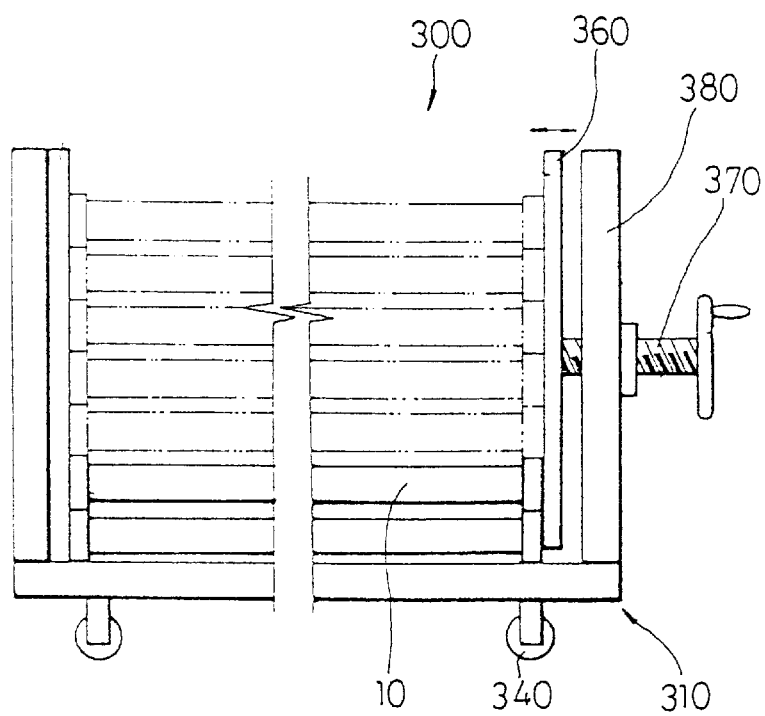
FIG. 11 is a side view of another preferred embodiment of the heaping means according to the present invention.

And, as shown in FIG. 3, FIG. 10, and FIG. 11, the apparatus according to the present application includes a heaping means 300 for heaping the aluminium chassis 10 such that the aluminium chassis 10 is filled smoothly.

Figure 8:
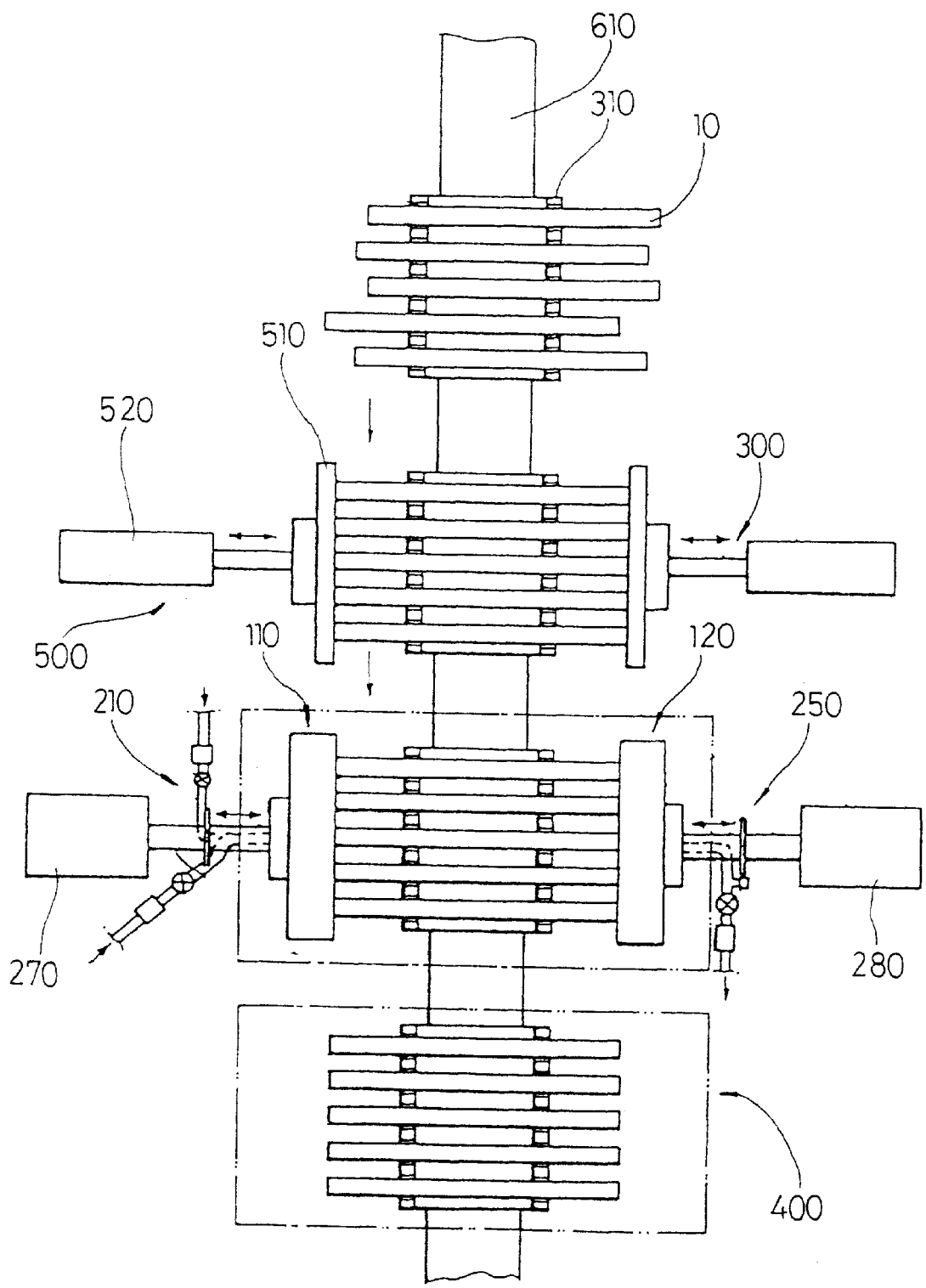
FIG. 8 is a principal configurational view showing the working process carried out by a transfer means according to the present invention.

As shown in FIG. 8, there is provided a transfer means which includes a transfer conveyor 610 moving repeatedly at the definite interval every time to stay controlled by the ordinary control means so as to convey smoothly the aluminium chassis 10 heaped on the heaping means 300 according to the working process. The heaping means 300 is attached to the transfer conveyor.

As shown in FIG. 8, the apparatus of the present invention is provided with an arranging means 500 for arranging the aluminium chassis 10 heaped in the heaping groove 320a of a heaping stand 310 by an arranging plate 510 actuated by an arranging actuator 520.

Figure 9:
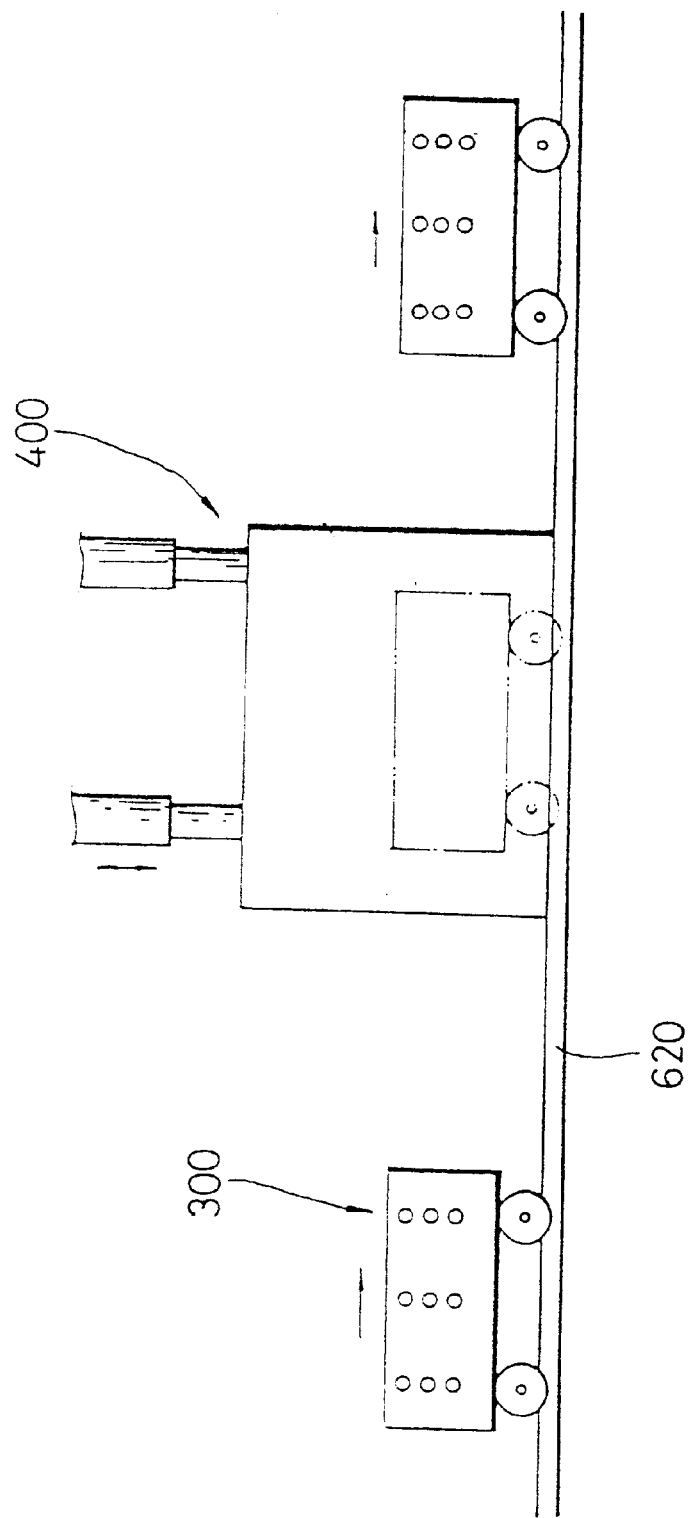
FIG. 9 is a configurational view of another embodiment of the working process carried out by the transfer means according to the present invention.

As shown in FIG. 9, a roller 340 is provided at the lower part of the heaping means 300 to move the heaping means 300 according to the working process.

Figure 4:
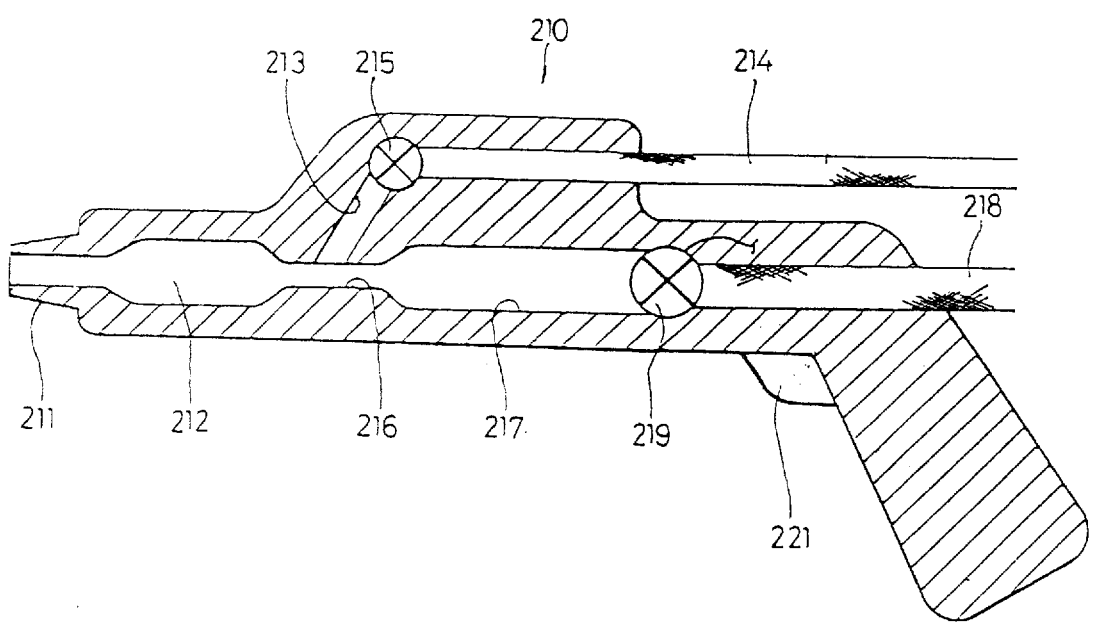
FIG. 4 shows a sectional view of a preferred embodiment of a filling unit for the filling means according to the present invention.

And, as shown in FIG. 4, the filling unit 210 of the filling means for granular foam includes an engaging portion 211 for engaging into the engaging groove 111, 121 of the filling caps 113 connected to one side of the aluminium chassis 10 on the front end, a filling path 212 to which the supplying path for dry vapor 217 connected to the supplying tube for dry vapor 218 through communication with said engaging portion 211 in the inner side, the filling path having a venturi portion 216 formed at the front, a supplying path for granular foam 213 connected to the supplying tube for granular foam 214 on the upper part of the venturi portion of said filling path 212, a control valve for dry vapor 219 formed between said the supplying path for dry vapor 217 and said filling path 212, a control valve for granular foam 215 formed between the supplying tube for granular foam 214 and the supplying path for granular foam 213, a filling control unit 230 for controlling said control valve for dry vapor 219, the control valve for granular foam 215 and an control valve 251 for exhaust from the exhaust unit 250, and a manipulating means for inputting a filling signal to said filling control unit 230.

Figure 6:
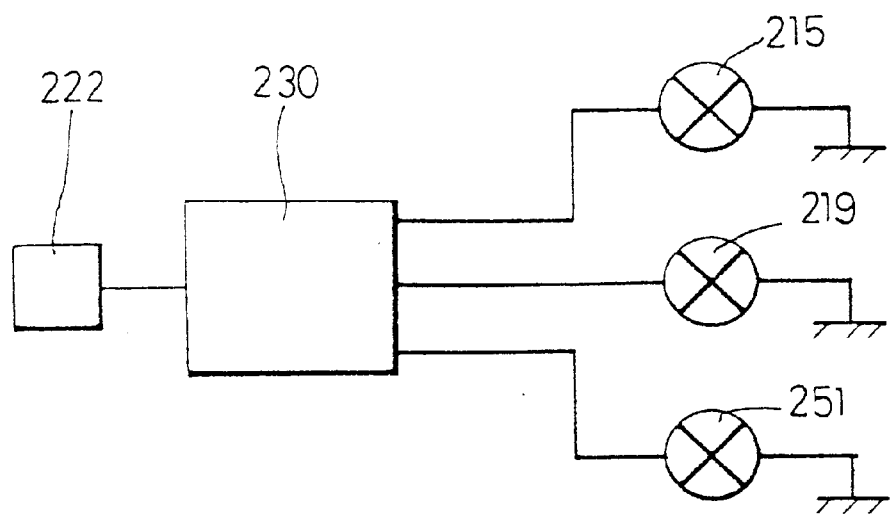
FIG. 6 shows a configurational view of another preferred embodiment of the actuating means for the filling unit according to the present invention.

As shown in FIG. 6, the manipulating means includes a sensor 222 for sensing when the engaging portion 211 is engaged into the engaging grooves 111 of the filling caps 113 on its front end, and inputting the filling signal to the filling control unit 230.

Figure 5:
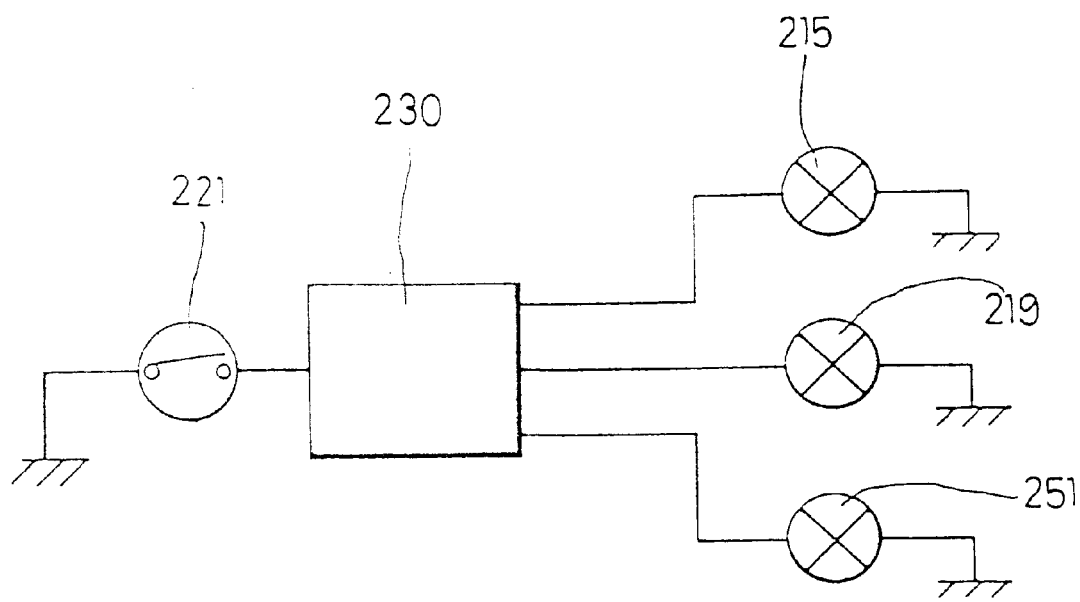
FIG. 5 shows a configurational view of a preferred embodiment of an actuating means for the filling unit according to the present invention.

As shown in FIG. 5, the manipulating means further comprises a manipulating button 221 for inputting the filling signal to the filling control unit 230 by the manipulation of an operator.

The filling means for granular foam is actuated by the steps of: receiving a filling signal from the manipulating means including the sensor 222 for sensing the engagement or the manipulating button 221; filling the preliminary granular foam together with dry vapor by controlling the control valve for exhaust 251, the control valve for dry vapor 219, and the control valve for granular foam 215 in accordance with said filling signal; and supplying only the dry vapor for a given time period by controlling the control valve for granular foam 215 such that supply of the preliminary granular foam is interrupted to the filling path 212 through the supplying tube for granular foam 214 after filling of the preliminary granular foam has been completed for the time period fixed according to the specification of the aluminium chassis 10 through said step of filling the preliminary granular foam.

Figure 7:
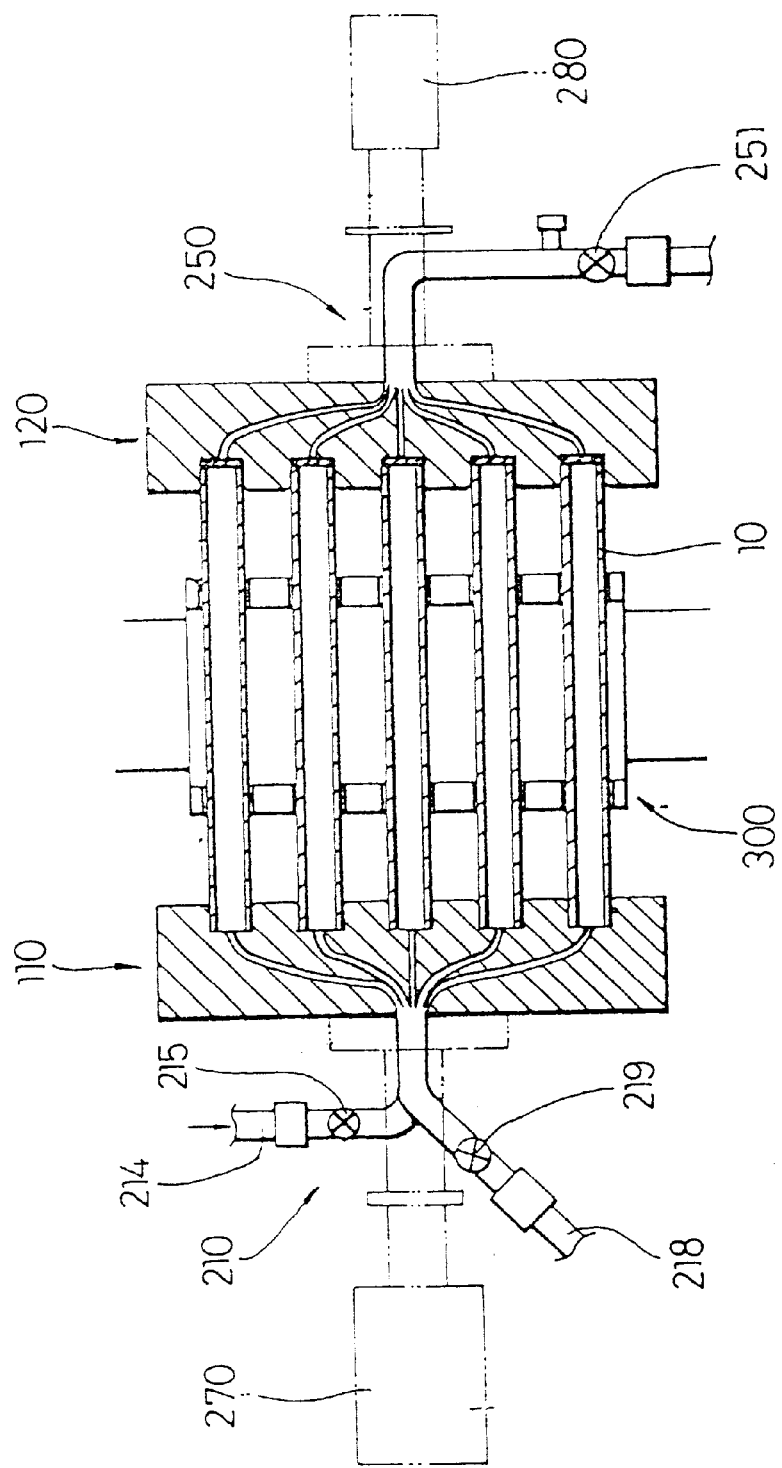
FIG. 7 shows a plan sectional view of another preferred embodiment of the filling unit according to the present invention.

Also, as shown in FIG. 7 and FIG. 8, the filling unit 210 and the exhaust unit 250 of the filling unit for granular foam are actuated by a filling actuator 270 and an exhaust actuator 280 driven by the control unit.

According to an embodiment of the present invention, as shown in FIG. 10, the heaping means 300 includes a heaping die 320 having the heaping groove 320a for guiding the aluminium chassis such that the chassis is put by the definite width, and a heaping stand 310 for heaping said heaping die 320 side by side. A engaging unit 350a, 350b in the form of groove and protrusion for heaping a plurality of said heaping die 320 heaped side by side uniformly and securely is provided at the corner and the central upper surface of said heaping stand 310 and at the upper and lower faces of the both ends of the heaping die 320.

An actuator 330 for the plug means is provided at the lower parts of both sides of the heaping stand 310. The actuator 330 for the plug means is connected to the both sides of the aluminium chassis 10 for driving the filling plate 110 and the exhaust plate 120 for the plug means 100 which closes the hollow portion 11. And a roller 340 is provided at the lower part of the heaping stand 310. The roller 340 is transferable according to the working process.

Meanwhile, according to another embodiment of the present invention, as shown in FIG. 11, the heaping means 300 is provided at the both sides with a guiding bracket 360 for preventing escape of the filling plate 110 and the exhaust plate 120 of the plus means 100 connected to the both ends of is the aluminium chassis, for heaping the aluminium chassis, and for arranging them. The guiding bracket 360 is advanced and retreated by the shaft of a screw 370 screwed into the bracket 380.

Figure 12:
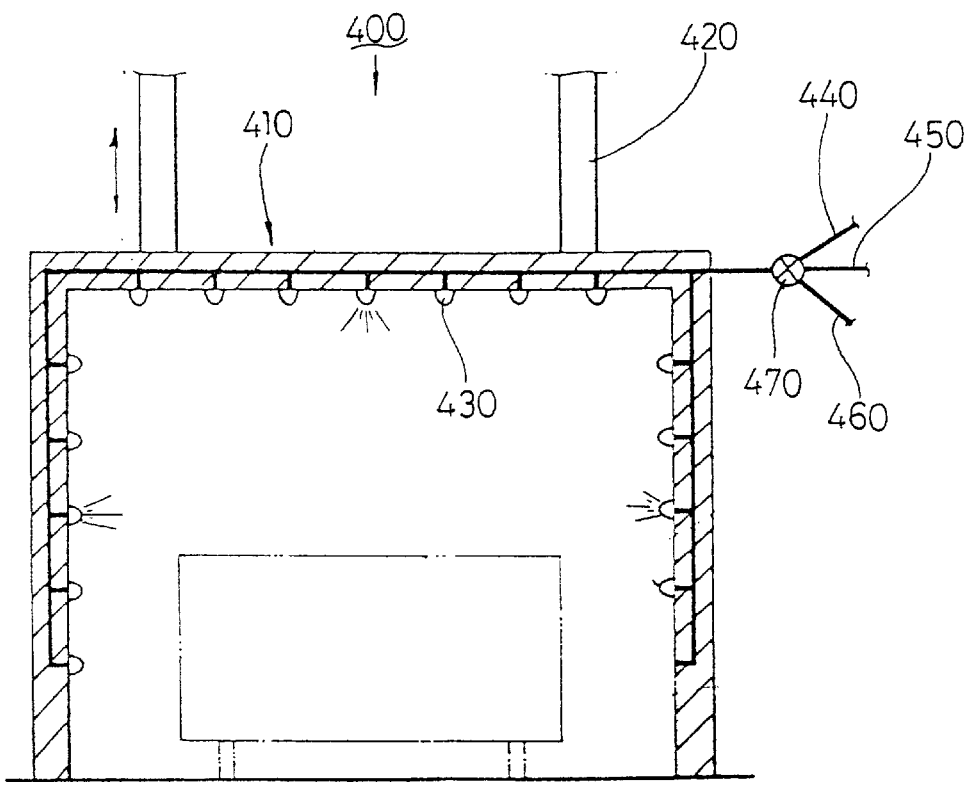
FIG. 12 is a side sectional view of a preferred embodiment of a maturing means according to the present invention.
Figure 13:
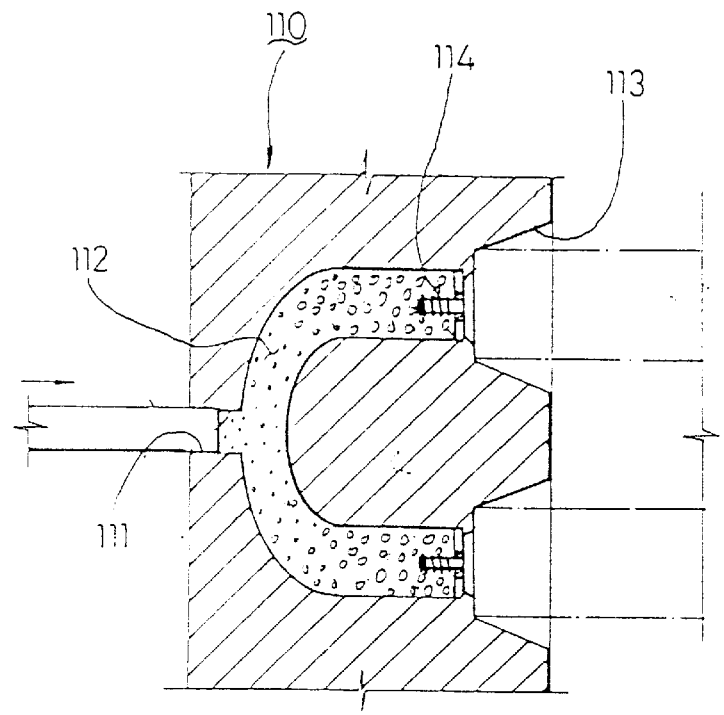
FIG. 13 is a side sectional view of a preferred embodiment of a filling plate for the plug means according to the present invention.
Figure 14:
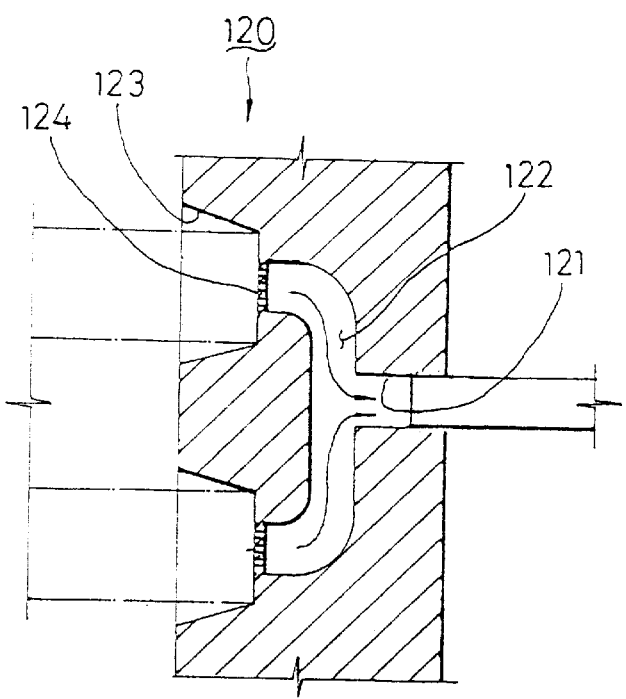
FIG. 14 is a side sectional view of a preferred embodiment of an exhausting plate for the plug means according to the present invention.

And, as shown in FIG. 12, the maturing means 400 includes a maturing room 410 with nozzle 430 for spraying dry vapor from a supplying tube for dry vapor 218 and cooling water and for blowing pressurized air by an ordinary maturing control means. The maturing room is up and down by the actuator 420 for the maturing room. The maturing means 400 also includes a maturing control valve 470 for supplying selectively one of the dry vapor, the cooling water and the pressurized air through said nozzle 430 by the maturing control means.

The maturing control means for the maturing means 400 is actuated by the steps of: lowering the maturing room 410 by driving the actuator 420 for the maturing room; supplying the dry vapor for a given time period through the nozzle 430 by controlling the maturing control valve 470 after completion of said step of lowering the maturing room, whereby the aluminium chassis 10 being heated; supplying the cooling water for a given time period through the nozzle 430 by controlling the maturing control valve 470 after completion of said step of supplying the dry vapor, whereby the aluminium chassis 10 being cooled; and blowing the pressurized air through the nozzle 430 by controlling the maturing control valve 470 as well as driving the actuator 420 for the maturing room to rise the maturing room 410 after completion of said step of supplying the cooling water, whereby the aluminium chassis 10 wetted with the cooling water being dried.

The operation of the present invention will now be described.

The preliminary granular foam is filled in the hollow portion 11 of the aluminium chassis 10 heaped on the heaping means 300 side by side and having the both ends of the hollow portion 11 closed with the plug means 100, by creating the negative pressure in the hollow portion 11 using the filling means for granular foam. At this time, the dry vapor is also supplied for smooth foaming of the preliminary granular foam while the preliminary granular foam is filled.

After completion of filling the preliminary granular foam, the aluminium chassis 10 is moved to the maturing rooms 410 of the maturing means 400 by the transfer means comprising rail 620 or the transfer conveyor 610, where maturing process is carried out on the preliminary granular foam foamed by the dry vapor of high temperature. Consequently, the heat insulating foam is filled in the hollow portion 11 of the aluminium chassis 10.

The cooling water from the supply tube for cooling water 450 is spread to the aluminium chassis filled with the heat insulating foam 20 by the maturing means 400 through the nozzle 430 so at to cool the aluminium chassis. After completion of the cooling process, the pressurized air from the supply tube for pressurized air 460 is blown by force to the aluminium chassis 10 so as to dry the aluminium chassis wetted with the cooling water. AS a result, the improved aluminium chassis is obtained which has an efficiency of heat insulation and sound absorption.

INDUSTRIAL APPLICABILITY

According to the present invention, an efficiency of heat insulation and sound absorption of the building is improved considerably as heat insulation foam is filled in the hollow portion of the aluminium chassis for windows and doors. Also, an efficiency of work is improved considerably as heat insulation foam is filled in the hollow portion of the aluminium chassis in accordance with the fixed working process.

What is claimed is:

1. An apparatus for manufacturing a casing having an aluminum tube and an insulation, comprising:

plugging means for plugging said aluminum tube, said plugging means including a filling plate connected to one end of said aluminum tube and a suction plate connected to the other end of said aluminum tube;

filling means for filling a hollow of said aluminum tube with a preliminary granular foam, said filling means including a filling unit connected to said filling plate for supplying said preliminary granular foam, and a suction unit connected to said suction plate for sucking said preliminary granular foam to fill said hollow with said preliminary granular foam; and maturing means for maturing said preliminary granular foam by heating and cooling said preliminary granular foam, said maturing means including a maturing room receiving said aluminum tube filled with said preliminary granular foam.

2. The apparatus as claimed in claim 1, further comprised of: said filling plate further comprising at least one first cap formed on an inner surface of said filling plate, said first cap receiving said aluminium tube and including a check valve, at least one first hole formed on the outer surfaces of the filling plate, said first hole receiving said filling unit, and at least one first path connecting at least one said aluminium tube to at least one said first hole; and said suction plate having at least one second cap formed on the inner surface of said suction plate, said second cap receiving said aluminium tube, at least one second hole formed on the outer surfaces of said filling plate, said second hole receiving said suction unit, and at least one second path connecting at least one said aluminium tube to at least one said second hole.

3. The apparatus as claimed in claim 1, further comprising a heaping means for heaping the aluminum tube.

4. The apparatus as claimed in claim 3, said heaping means further comprising:

a heaping die having a heaping groove guiding said aluminum tube; and a heaping stand for heaping said heaping die side by side.

5. The apparatus as claimed in claim 3, or claim 4, said plugging means further comprising a plugging actuator actuating said filling plate and said suction plate.

6. The apparatus as claimed in claim 3, said heaping means further comprising a roller mounted at a bottom of the heaping means.

7. The apparatus as claimed in claim 4, said heaping means further comprising a first bracket, a second bracket and a screw, said first bracket preventing an escape of the filling plate and the suction plate, heaping the casing, and arranging the casing, said first bracket being advanced land retreated by a shaft of said screw screwed into said second bracket.

8. The apparatus as claimed in claim 1, said maturing means further comprising:
- a cooling unit cooling the casing; and
- a drying unit drying the casing.

9. The apparatus as claimed in claim 1, said maturing room further comprising:
- a first tube for supplying a dry vapor;
- a second tube for supplying a cooling water;
- a third tube for supplying a pressurized air;
- a nozzle spraying the dry vapor from said first tube and the cooling water from said second tube, said nozzle blowing the pressurized air from said third tube;
- a first control valve selectively supplying one of controlling said dry vapor, said cooling water, and said pressurized air to said nozzle; and
- a maturing actuator moving said maturing room up and down.

10. The apparatus as claimed in claim 9, said maturing means further comprising:
- second controlling means for controlling said maturing means, said second controlling means controlling said maturing actuator and said first control valve so that, after said maturing room is lowered by said maturing actuator, the dry vapor, the cooling water, and then the pressurized air is supplied.

11. The apparatus as claimed in claim 1, further comprising transferring means for transferring said casing, and a heaping means attached to said transferring means.

12. The apparatus, as claimed in claim 11, said transferring means being a conveyor moving repeatedly at a predetermined interval.

13. The apparatus as claimed in claim 1 or claim 11, further comprising an arranging means for arranging said aluminum tube, said arranging means including an arranging plate and an arranging actuator actuating said arranging plate.

14. The apparatus as claimed in claim 1, said filling unit further comprising:
- an engaging portion engaged to said filling plate, said engaging portion having a third path;
- a filling path connected to said third path, said filling path including a venturi path;
- a fourth path for supplying said preliminary granular foam, said fourth path connected to a fourth tube for supplying said preliminary granular foam, said fourth path connected to said venturi path;
- a fifth path for supplying a dry vapor, said fifth path connected to said venturi path and a first tube for supplying the dry vapor;
- a second control valve mounted between said fifth path and said first tube, said second control valve selectively supplying the dry vapor;
- a third control valve mounted between said fourth path and said fourth tube, said third control valve selectively supplying said preliminary granular foam.

15. The apparatus as claimed in claim 14, said filling means further comprising:
- first controlling means for controlling said filling means, said first controlling means including a filling control unit and an input unit inputting a filling signal to said filling control unit.

16. The apparatus as claimed in claim 15, said input unit being a sensor sensing an engagement of said engaging portion with said first hole and inputting said filling signal to said filling control unit.

17. The apparatus as claimed in claim 15, said input unit comprising a button for manually inputting the filling signal to the filling control unit.

18. The apparatus as claimed in claim 14, further comprised of:
- said suction unit further comprising a fourth control valve selectively sucking said preliminary granular foam to fill the hollow with said preliminary granular foam.

19. The apparatus as claimed in claim 18, said filling means further comprising a filling actuator actuating said filling unit and a suction actuator actuating said suction unit.

20. The apparatus as claimed in claim 19, said filling means further comprising:
- first controlling means for controlling said filling means, said first controlling means including a filling control unit and an input unit inputting a filling signal to said filling control unit, said filling control unit receiving said filling signal from said input unit, said filling control unit controlling said filling and suction actuators and said second, third and fourth control valves so that the preliminary granules and the dry powder are supplied to said aluminum tube and then, after a predetermined time, only the dry powder is supplied.

21. The apparatus as claimed in claim 1, said filling means further comprising:
- a filling actuator actuating said filling unit; and
- a suction actuator actuating said suction unit.

22. The apparatus as claimed in claim 1, said plugging means further comprising a plugging actuator actuating said filling plate and said suction plate.

23. An apparatus for manufacturing a casing having an aluminum tube and an insulation, comprising:
- plugging means for plugging at least two said aluminum tubes including a first aluminum tube and a second aluminum tube, said plugging means including a first plate and a second plate, each of said first and second aluminum tubes having a first end connected to said first plate and a second end connected to said second plate, said first plate including a filling cap receiving said first aluminum tube and a suction cap receiving said second aluminum tube, said second plate including a pipe connecting said second ends of said first and second aluminum tubes each other, so that a filling and a suction process is carried out at one side;
- filling means for filling said first and second aluminum tubes with a preliminary granular foam, said filling means connected to said first plate, said filling means including a filling unit and a suction unit, said filling unit supplying said preliminary granular foam to said first aluminum tube, said suction unit sucking said preliminary granular foam supplied by said filling unit to fill said first and second aluminum tubes with the preliminary granular foam; and
- maturing means for maturing said preliminary granular foam by heating and cooling said preliminary granular foam, said maturing means including a maturing room receiving said casing.

* * * * *